(12) United States Patent
Ascari et al.

(10) Patent No.: US 6,796,224 B2
(45) Date of Patent: Sep. 28, 2004

(54) MACHINE FOR THE INDUSTRIAL PEELING OF CITRUS FRUITS

(75) Inventors: Carlo Ascari, Cavewwo (IT); Luca Ascari, Cavezzo (IT)

(73) Assignee: ABL S.r.l., Cavezzo (IT)

( * ) Notice: Subject to any disclaimer, the term of this patent is extended or adjusted under 35 U.S.C. 154(b) by 0 days.

(21) Appl. No.: 10/700,453

(22) Filed: Nov. 5, 2003

(65) Prior Publication Data

US 2004/0089166 A1 May 13, 2004

(30) Foreign Application Priority Data

Nov. 6, 2002 (IT) .................................... MO2002A0322

(51) Int. Cl.[7] .......................... A23N 7/00; A47J 17/00; A47J 17/14; A47J 17/16
(52) U.S. Cl. ............................. 99/489; 99/491; 99/546; 99/584; 99/588; 99/589; 99/636
(58) Field of Search ......................... 99/539–546, 584, 99/588–599, 486–492, 600–643; 426/481–483

(56) References Cited

U.S. PATENT DOCUMENTS

| | | | | |
|---|---|---|---|---|
| 1,872,731 A | * | 8/1932 | Goranson et al. | 99/593 |
| 2,882,945 A | * | 4/1959 | De Back et al. | 99/546 |
| 3,058,502 A | * | 10/1962 | Loveland et al. | 99/543 |
| 3,067,791 A | * | 12/1962 | Boyce | 99/593 |
| 3,132,750 A | * | 5/1964 | Grotewold | 414/744.2 |
| 3,680,614 A | * | 8/1972 | Polk, Jr. | 99/589 |
| 4,176,594 A | * | 12/1979 | Amstad | 99/593 |
| 4,318,339 A | * | 3/1982 | Sage | 99/589 |
| 4,430,932 A | * | 2/1984 | Tichy et al. | 99/593 |
| 4,787,305 A | * | 11/1988 | Akesson | 99/538 |
| 5,027,699 A | * | 7/1991 | Paterson et al. | 99/593 |
| 5,161,459 A | * | 11/1992 | Paterson | 99/593 |
| 6,523,464 B1 | * | 2/2003 | Widelo | 99/541 |

\* cited by examiner

Primary Examiner—Timothy F. Simone
(74) Attorney, Agent, or Firm—Young & Thompson

(57) ABSTRACT

The invention relates to a machine used for the industrial peeling of citrus fruits and specifically oranges. The only manual operation to be performed corresponds to the loading, since the orange must be oriented. The machine has a high productivity, and does not lead to production reject, since even the peel is recoverable. The machine can be realized in a form that includes a single production line, or in one which includes several simultaneously operating production lines.

22 Claims, 11 Drawing Sheets

MACHINE FOR THE INDUSTRIAL PEELING OF CITRUS FRUITS

TECHNICAL FIELD

The present invention relates to a machine for industrial use, suited to peel citrus fruits and particularly oranges, so that they can be subsequently employed to make fruit salads, confectionery products, ice-creams or other food products.

BACKGROUND ART

At the present state of the art, there exist various manual and semiautomatic devices designed for peeling prevalently oranges.

None of the traditional devices provides for an automatic process, from fruit loading up to the final processing step, nor successive processing stations or the possibility to work simultaneously on more rows (lines).

Moreover, each of the known machines requires the presence of an operator, and the productivity is limited to only some oranges per hour due to the fact that in addition to the peel itself it is necessary to remove the white part—or mesocarp—as well, which is located below the peel. This low productivity has a great impact on costs and limits the offer of the peeled product.

It should be added that that the fragmentation and mistreatment of the peel renders its utilization laborious and expensive, since, in fact, the peel also has various uses. The extraction of essential oils from the peels has applications in perfumeries, in the production of liquors, and in pharmaceutics.

A main object, although not the only one, of the present invention, is to automate the peeling operations, not only of oranges, but of the whole variety of citrus fruits and of any fruits and vegetables having analogous characteristics with regard to peeling. A further object consists in the automation of the reading/detection of the thickness of the peel and the underlying mesocarp to be removed, and in the automatic adjustment of the machine for carrying out this removal; the intervention of a skilled operator, who treats fruits one by one, is no more necessary.

Still a further object is to realize a machine with a high productivity, which may include several peeling rows (lines), and that always requires the presence of a single operator for its operation.

A further feature is that the removed skin is not fragmented but forms a single spiral that facilitates its use by the respective industries.

Still a further object of the invention is to realize a peeling machine for citrus fruits, that may be simply and economically constructed, and that does not require qualified people.

DISCLOSURE OF INVENTION

These and other objects are attained by the machine of the present invention, which comprises several work stations, in which successive processing operations are performed, starting from the loading of each fruit, followed by the detection of the thickness of the peel and mesocarp to be removed, up to the peeling, and finally the end-cutting and release of the peeled fruit; the machine being characterized in that it includes a feeder, actuated by an intermittent device that causes its advancement in synchronism with the other parts of the machine; a manipulator, including pliers, that grasp and take the fruit from the feeder and displace it to a predetermined position; a rotatable turntable with horizontal axis, including four stations, said turntable grasping and retaining the fruit in the first station, and rotating it thereafter step by step towards the following stations; four mechanisms, one for each respective station, and having each a specific function, that is, to grasp and retain the fruit, to detect and assign a numeric value to the fruit diameter and to the thickness of the fruit and mesocarp, to peel the fruit, to cut the fruit at its ends (end-cutting) corresponding to the seizing regions, to separately release the peel and the peeled fruit already cut at its end regions; the machine being further provided with a mechanism that brings about the intermittent motion, and with connection means between the various mechanisms.

BRIEF DESCRIPTION OF DRAWINGS

Further features and advantages of the invention will result more clearly from the description of a preferred and non-limitative embodiment of a machine shown for exemplificative and not binding purposes in the annexed drawings wherein:

FIG. 9/bis illustrates one of the possible motions that may be performed by the mill supporting shaft, as seen in plan view in the direction of the arrow F1;

DESCRIPTION OF PREFERRED EMBODIMENTS

In the various figures, some portions of the machine have been omitted for clarity, such as the structure, or basement, of the machine; moreover, always with the aim to give a clear and concise description, the annexed drawings do not include structural, common elements, nor any mechanism that may be considered known and/or intuitive for a technician.

In the various figures the same alphanumeric references indicate the same parts or elements.

Figure 1:
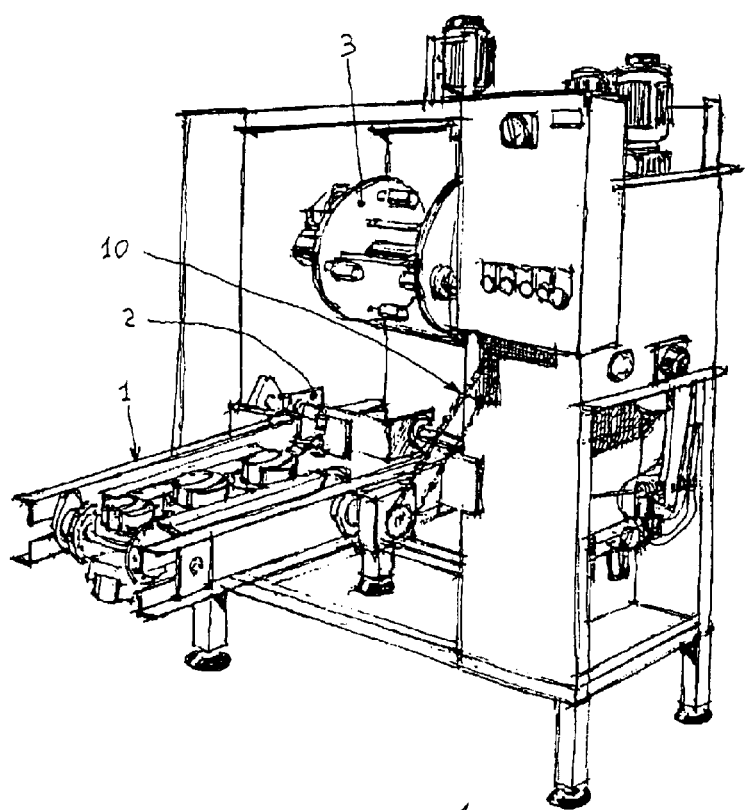
FIGS. 1 and 2 generally show the machine and correspond to two "angle-shots"; this machine processes a single row of fruits, and in these figures only its principal mechanisms are shown.
Figure 2:
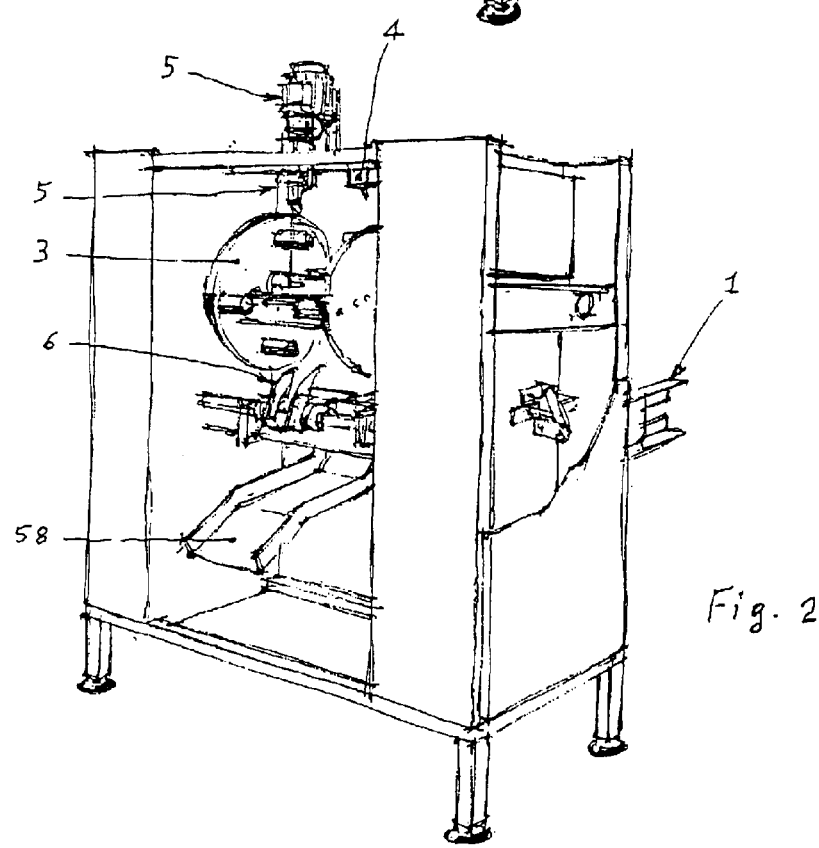

By referring to FIGS. 1 and 2, numeral 1 generally denotes the feeder, numeral 2 indicates the manipulator transferring the fruit, numeral 3 the turntable that includes four stations, numeral 4 the reader of the fruit diameter and of the thickness of the peel and mesocarp, numeral 5 the peeling device, and numeral 6 the end-cutting device.

Figure 4:
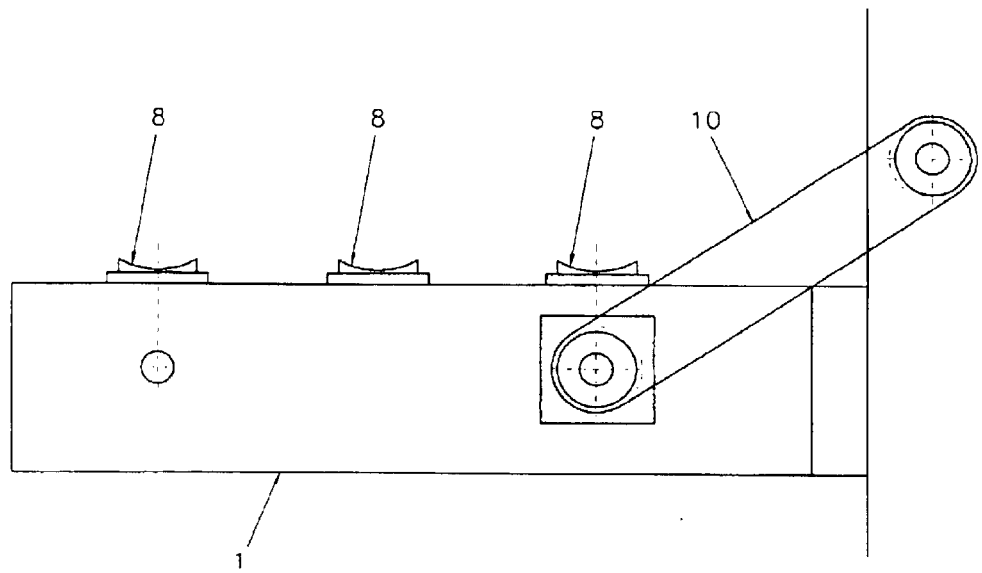
FIGS. 3 and 4 are two orthogonal views (plan and front) which schematically show the fruits feeder.
Figure 3:
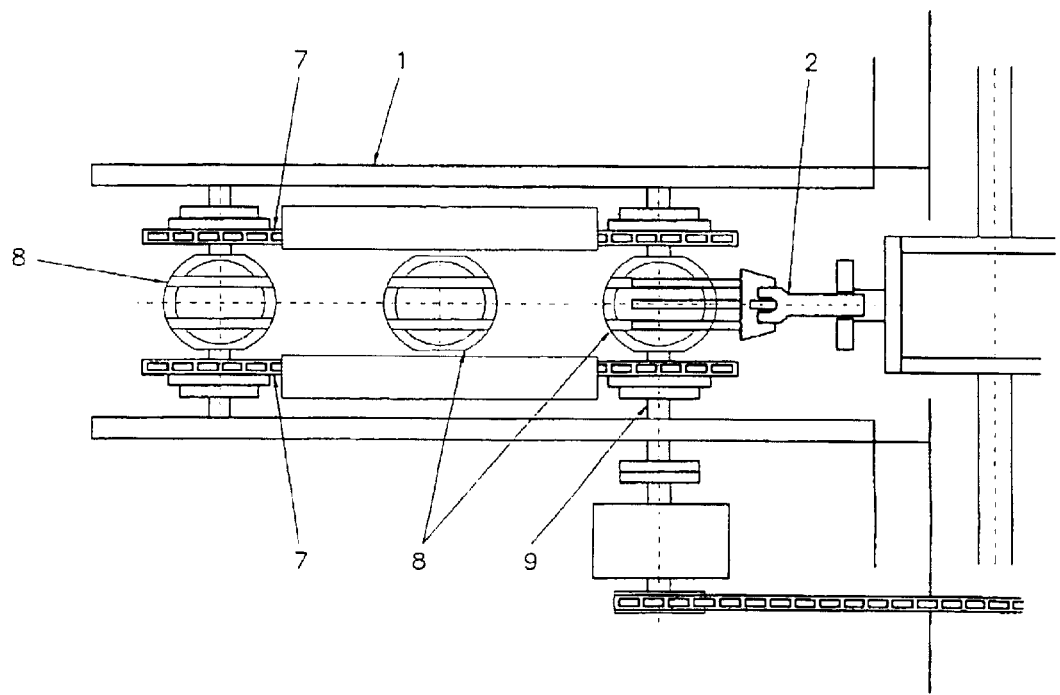

By reference to FIGS. 3 and 4, note that the feeder is characterized by chain means 7 of a known kind, or by any other known mechanism insuring a synchronism of the horizontal motion, to which there is attached a plurality of cups or caps 8, into each of which a respective fruit is manually put with its symmetry axis horizontally and perpendicularly disposed with respect to the advancement direction of said chain means.

The chain means are intermittently moved with a constant translation pitch, in synchronism with the other devices that make up the machine, and this motion is performed by means of any kind of known device suited to transmit an intermittent motion.

The driving shaft 9 may receive the motion through a chain 10 or any other known means that insures the maintenance of the timing, e.g.: a toothed belt, a cardan shaft, etc.

Figure 5:
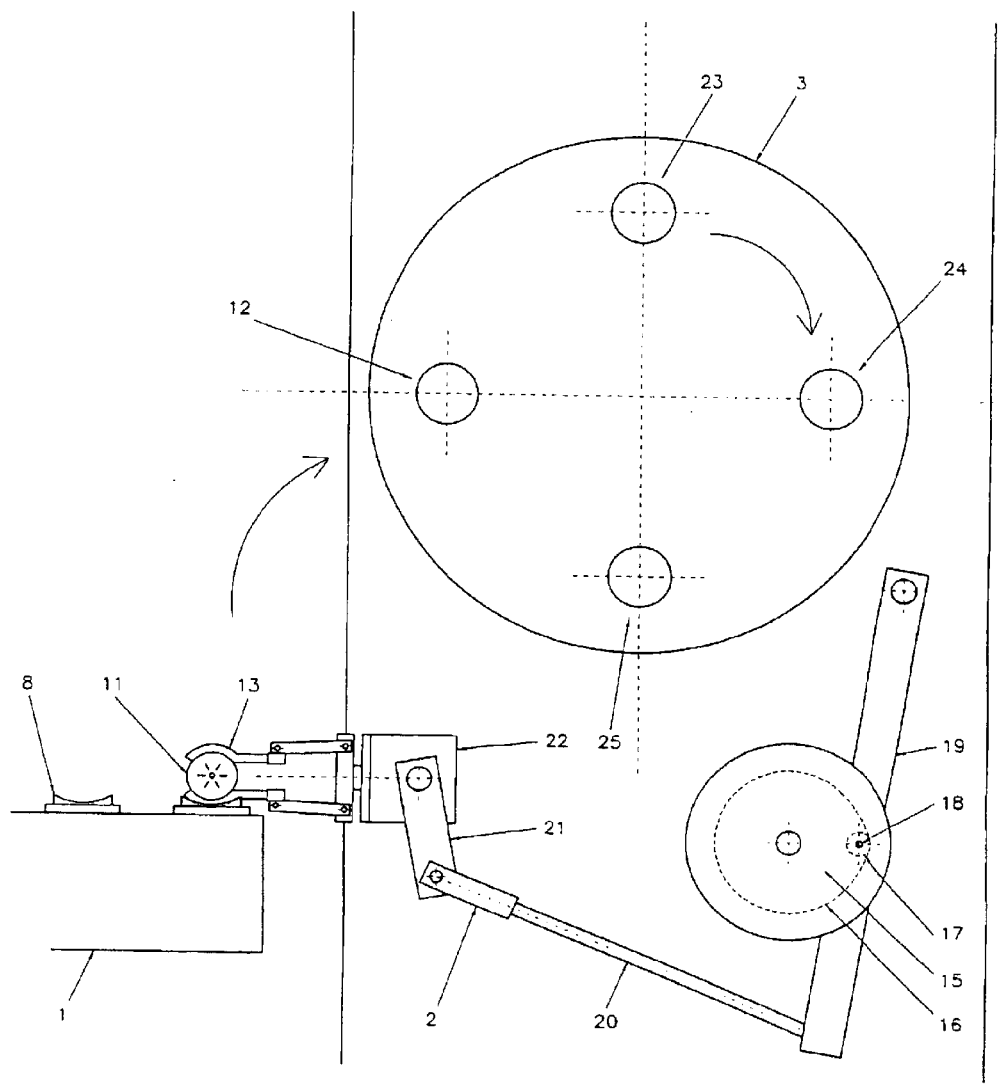
FIGS. 5 and 6 schematically indicate and illustrate the constitutive parts, the articulated joints, and the movements featuring the manipulator that transfers the fruits from the feeder to the four-stations turntable.
Figure 6:
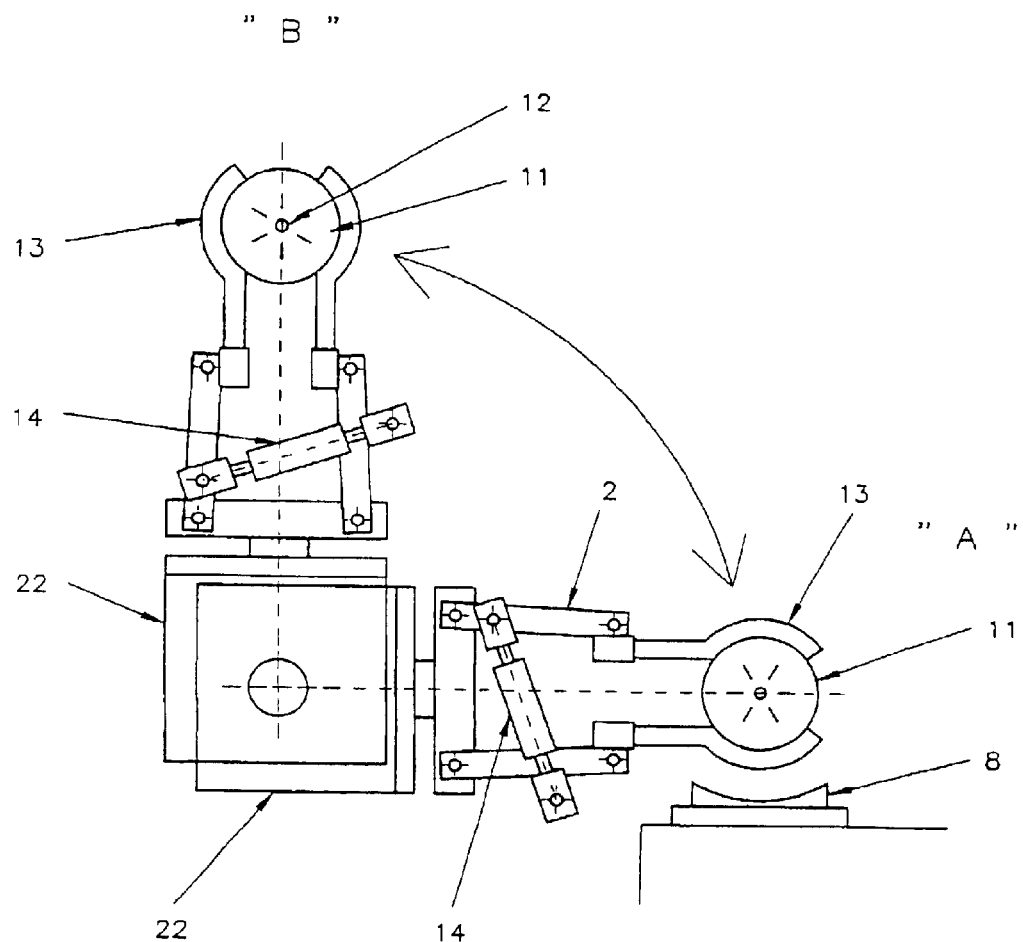

By referring to FIGS. 5 and 6, these specifically show (in FIG. 5) the manipulator with the pliers and its control mechanisms, all located in a position suited to pick up the fruit 11 from the feeder, and (in FIG. 6) the pliers taken individually and seen in the pick-up position "A" and in the position "B" coinciding with the axis 12 of the loading station where the fruit is loaded on the rotatable turntable 3.

The manipulator is characterized by pliers 13, which are actuated by a pneumatic actuator 14, and these pliers grasp the fruit 11 located on the feeder (FIG. 5) and displace it from the pick-up position (FIG. 6, "A") to the wait position (FIG. 6, "B") that coincides with the fruit clamping station of the turntable 3; the displacement is performed through the rotation of the cam 15, which is of a positive kind, that is, it has a slot 16 inside which a roller 17 is inserted, whose pin 18 is integral with a lever 19, and the latter, by means of a connecting rod 20 and a lever 21, acts on and displaces the transmission element 22. This movement—starting from the rotation of the cam 15—is synchronized with the feeder 1 and with the rotatable turntable 3. The rotatable turntable, denoted by 3 in FIG. 1, is shown in more detail in FIG. 7; it includes four processing stations, or work stations, located at 90° with respect to each other, which are illustrated in FIG. 5, wherein: numeral 12 indicates the fruit loading station, numeral 23 the measuring (reading) station of the fruit diameter and of the thickness of the peel and mesocarp, numeral 24 denotes the peeling station, and finally, numeral 25 indicates the end-cutting station where the processed fruit is discharged (released).

Figure 7:
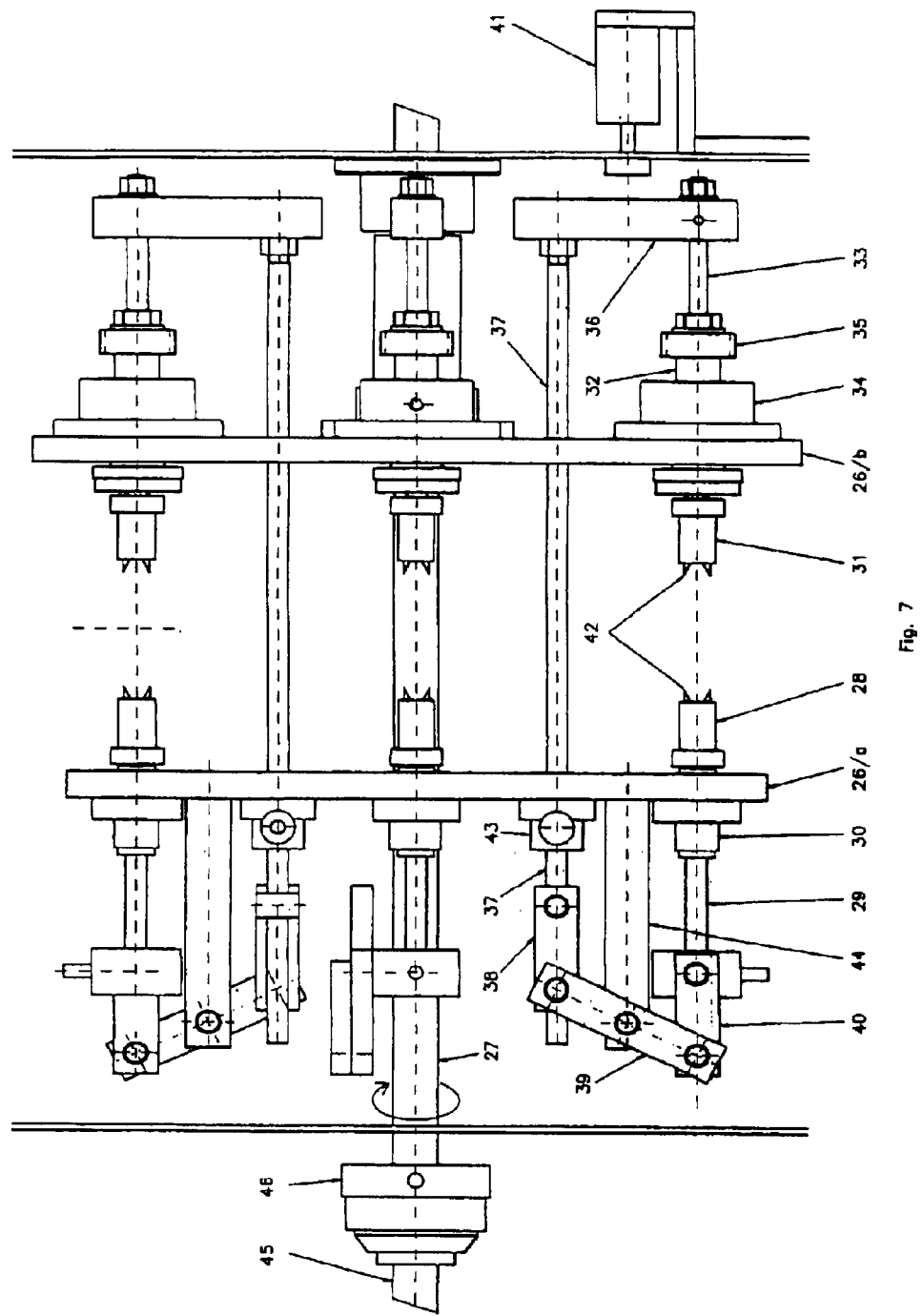
FIG. 7 generally shows a plan view of the four-stations turntable.

From FIG. 7 we observe that the rotatable turntable 3 is characterized by two circular plates 26/a–26/b that face each other at a mutual distance and which are integral with a shaft 27, the latter being intermittently rotated by means of a known mechanism (not shown). In radial positions and on the same circumference, at 90° to each other, identically formed pairs of spindles are located on said plates along the axes 12, 23, 24, 25 indicated in FIG. 5; these spindles have the following structure:

on one circular plate, for instance the circular plate 26/a, each mandrel or spindle is characterized by a rotatable head 28 idly mounted on a respective shaft 29, which is axially slidable inside the bushing 30, the latter being integral with the circular plate 26/a so that, by axially displacing the shaft 29 the rotatable head 28 is displaced at the same time; on the other hand, the mandrels or spindles mounted on the circular plate 26/b are characterized by a rotatable head 31 which is integral with the sleeve 32, the latter being idle on the small shaft 33; moreover, the sleeve 32 can axially slide inside the bushing 34 which is integrally formed on the circular plate 26/b. A toothed pinion 35 is fixed on the outer side of the sleeve 32 and on the opposite side of the circular plate 26/b with respect to the small head 31; by axially displacing the small shaft 33, the sleeve 32 and the respective pinion 35 and small head 31 are moved at the same time.

The two small heads 28 and 31 are located at a certain distance to each other, and this distance may be shortened by a concentric movement effected by means of a rod and a rocker arm, which operate as follows: the small shaft 33 is integral at one of its ends to a bracket 36 which, at its opposite end is rigidly connected to said rod 37, whose axis is parallel to the axis of the small shaft 33; moreover, said rod 37 freely passes through both circular plates 26/a–b, and supports at its other extremity a connecting rod 38 connected to a rocker arm 39, which in turn is linked to a second connecting rod 40 identical to the former one (38); the connecting rod 40 is connected to the small shaft 29 which supports the rotatable small head 28. The system is realized and arranged in such a way, that by axially pushing the bracket 36 by means of a linear actuator 41, both rotatable small heads 28–31 approach each other concentrically and clamp the fruit, and the latter is always disposed in the same spatial position independently of its size.

In order to preserve the clamping action, and in order to rotate the fruit when required, the following means are provided:

The small heads 28 and 31 are frontally provided with thorns 42 that stick into the peel of the fruit, while the rotation—required in station No. 3 (peeling) and station No. 4 (end-cutting)—is rendered possible by the fact that in these stations the above mentioned pinion engages respective toothed wheels (not shown), and the latter are suitably arranged and sized and are driven by any known means.

Once the fruit is clamped between the small heads 28, 31 in consequence of the pushing action of the actuator 41, and in order to maintain this clamping action in all (four) stations, the rod/rocking arm system is locked by means of pliers 43 or by any other known and appropriate device, which may be pneumatic or mechanical, and which locks the rod 37 by preventing any axial movement of the same.

Obviously, the body of the pliers 43 is integral with the machine structure, and specifically, the support 44 that sustains the rocker arm 39 is rigidly connected to the plate 26/a. If the pliers 43 that lock the rod 37 are pneumatically actuated, then it is self-evident that the shaft 27 which rotates the turntable 3, must be connected to the main driving shaft 45 by the interposition of a rotatable pneumatic coupling 46, which is realized in the usual manner and serves for distributing and for discharging compressed air according to the specific needs.

After having described the rotatable turntable, we next describe the mechanisms that operate in each station.

In the first station (position 12 in FIG. 5) the fruit is only clamped by the already described system "rod/rocker arm".

Figure 8:
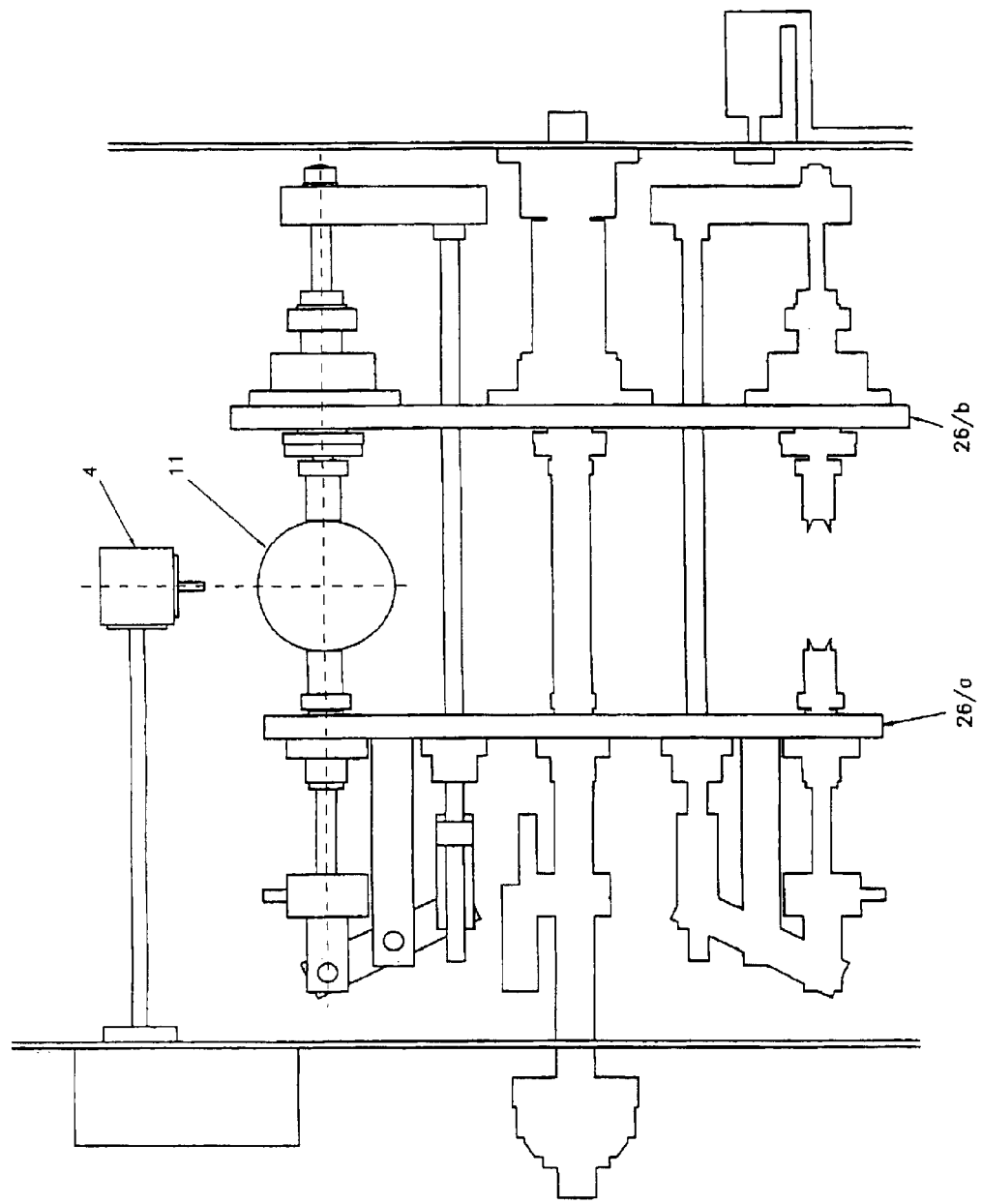
FIG. 8 schematically shows, in a front view, the device for the detection of the fruit diameter, and of the thickness of the 'peel plus mesocarp'; this device operates in station No. 2 of the turntable.
Figure 9:
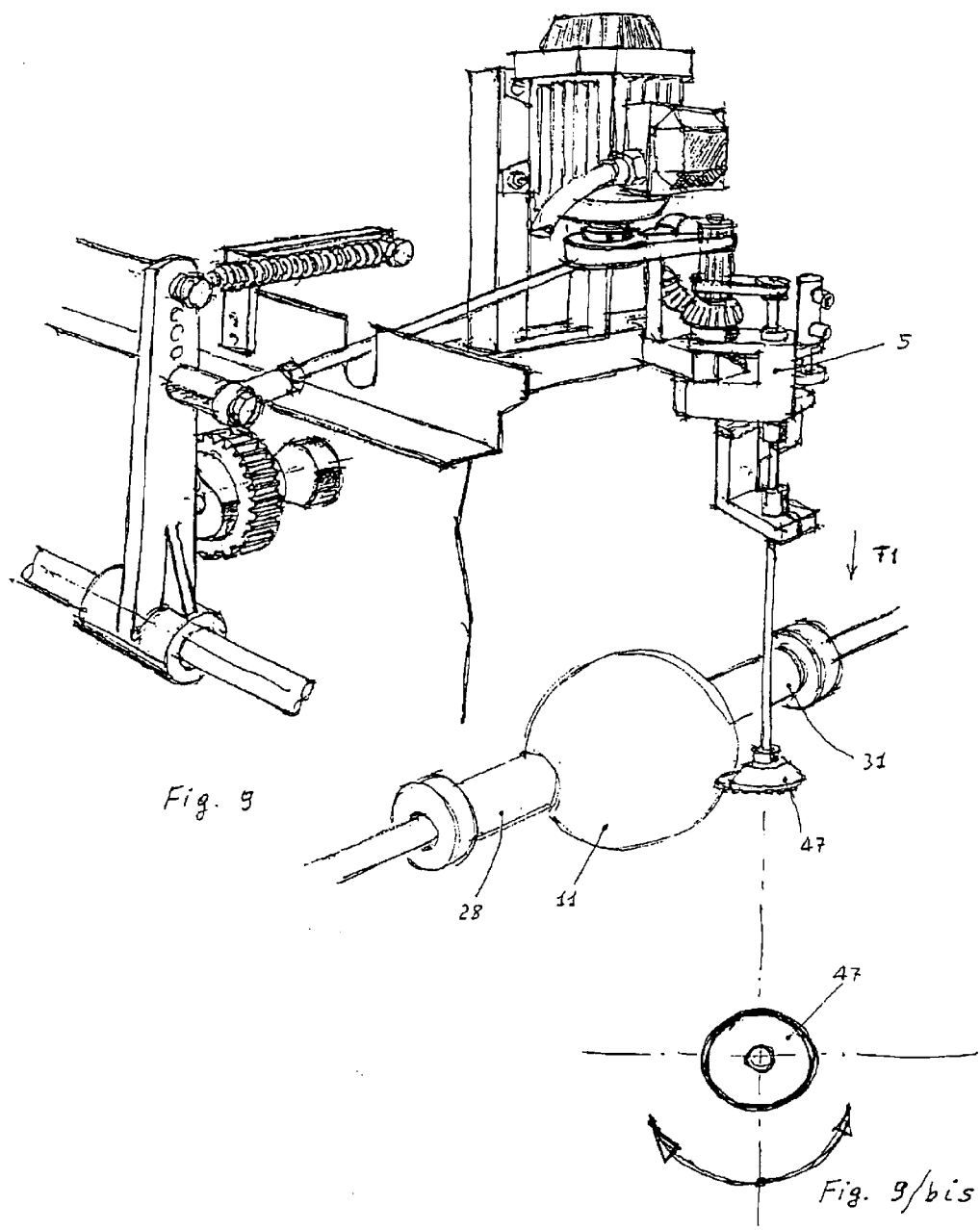
FIGS. 9, 9/bis and 10, schematically and generally illustrate the peeling device during its operation, in station No. 3 of the turntable.
Figure 10:
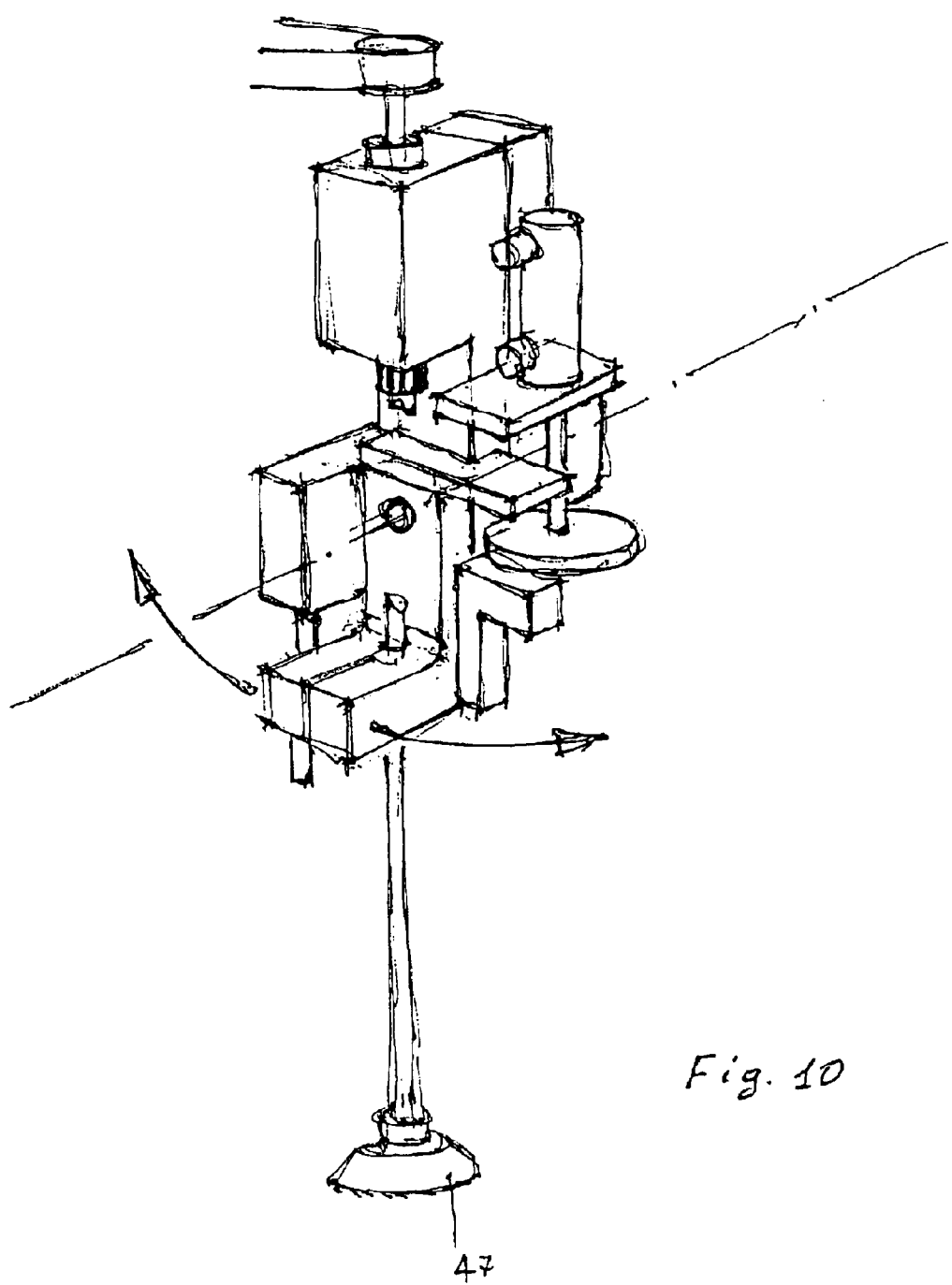
Figure 11:
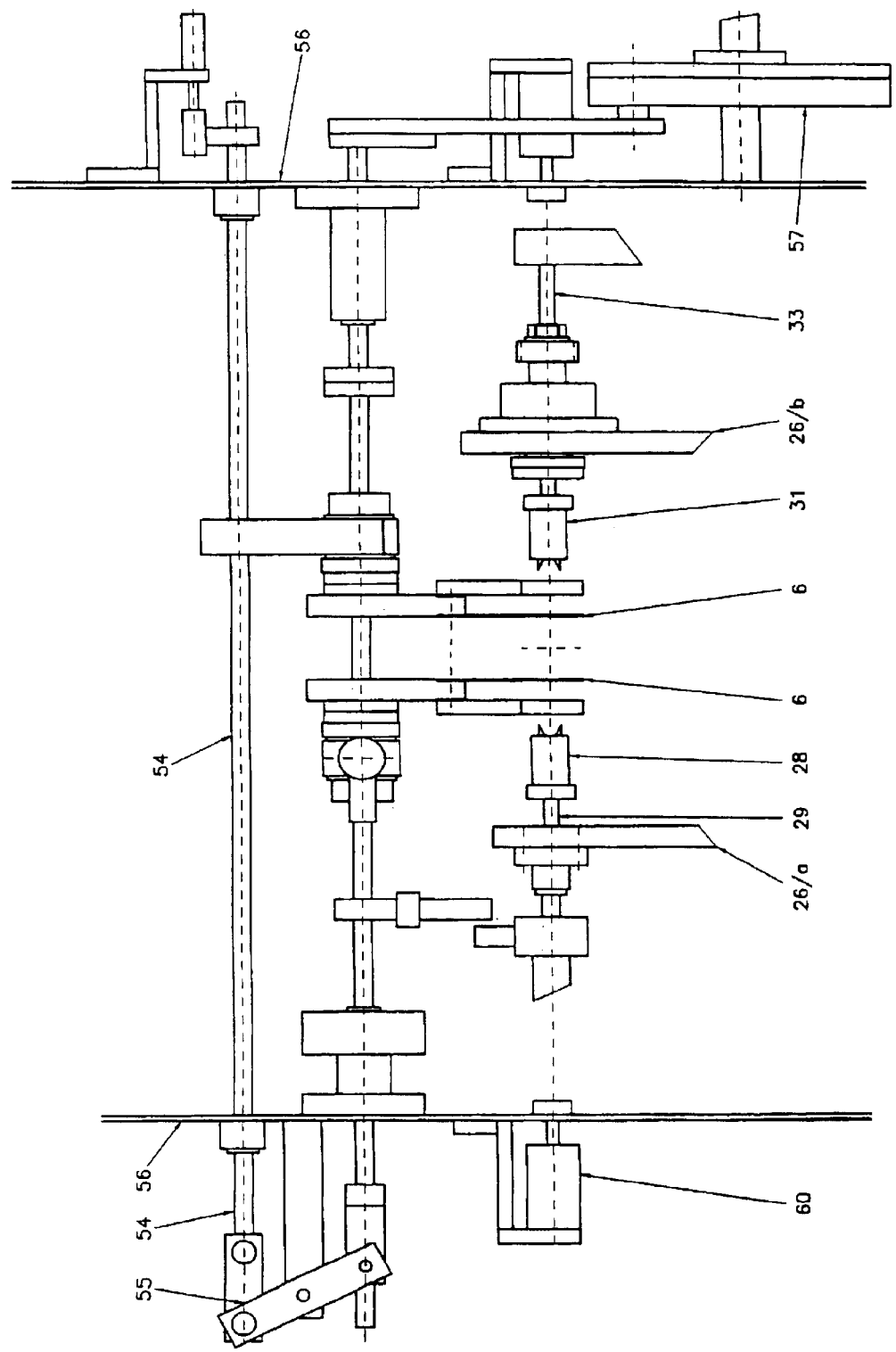
FIG. 11 schematically shows, in plan view, the composition and the operation of the end-cutting device, corresponding to station No. 4 of the turntable.

In the second station (position 23 in FIG. 5), as shown in FIG. 8, an already known laser device 4 measures the fruit diameter in addition to the thickness of the peel and mesocarp, and it sends a proportional signal to a step motor;

the latter, through an encoder and a respective electronic circuitry (not shown and already known) spatially positions the peeling device and its mill—in station No. 3—, which will perform fruit peeling Said peeling device (generally identified by reference numeral 5 in FIG. 2) is shown in FIGS. 9–9/bis and 10, and is known per se; see for instance the Italian patent application No. MO2000A000167 filed in Modena in Jul. 31, 2000, titled "Macchina automatica per la pelatura e la separazione in due o più parti delle pere", issued to ABL S.r.l. (applicant). The only difference between these two versions concerns the information relating to the data required to determine the path of the mill, which, in the present version, are detected by a laser beam and are electronically processed, whereas only a mechanical feeler or tracer point is used in the previous version, even though the latter could also be used in the present machine.

Figure 12:
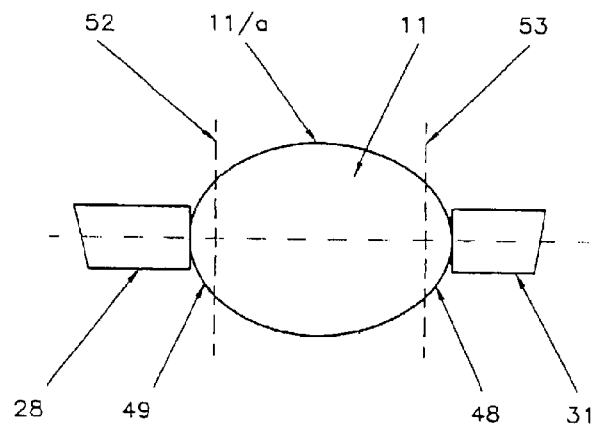
FIG. 12 shows the fruit's appearance at the end of the peeling operation.

In the fourth (and last) station, the machine performs the end-cutting of the fruit, consisting—see FIG. 12—in the removal of the small discs 48–49 which have not been subjected to peeling because they were covered by the small heads (spindles) 28, 31 that support the fruit 11, whereas the remaining part of the external surface 11/a of the fruit has already been peeled. This "end-cutting" is obtained (FIG. 1) while the fruit is set in rotation, and by the intervention of two cutting blades that cut the fruit along the two discontinuous lines 52–53 of FIG. 12.

Figure 13:
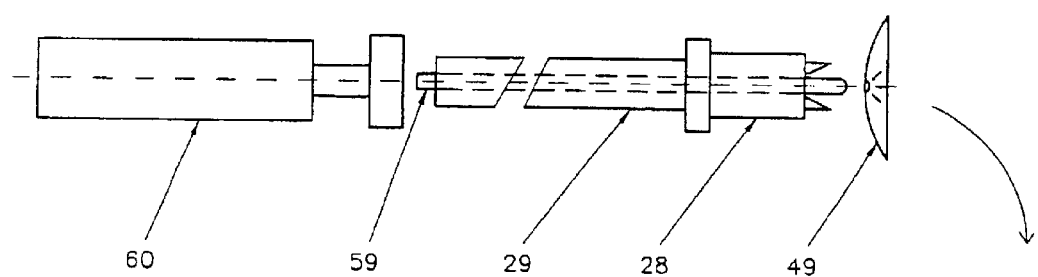
FIG. 13 illustrates the knockout device for the expulsion of the caps, or spherical ends of the fruit, after their separation.

These blades are arranged on a mechanism, including a rod 54 and a rocker arm 55, similar to the one already described in relation to the rotatable heads 28, 31, but which is supported by the fixed structure or basement 56 of the machine. This mechanism insures that the blades 6 are always in a position matching the position of the small heads 28, 31; a cam 57 allows the intervention of the blades at the right moment, that is, after termination of the peeling operation and at the time the mill 47 is in its rest position. After cutting, the blades 6 move out and apart, so that the fruit, that has been peeled and cut at its ends, can fall on an inclined plane 58 (FIG. 2). To prevent the discs (calottes) 48, 49 from remaining attached to the heads 28, 31, a rod 59 is inserted inside the small shafts 29, 33 (see FIG. 13), to act as an ejector (knockout) actuated by an actuator 60.

In the preceding description, no illustration and explanation have been given as to what means is used to bring about the intermittent motion, because this motion may be obtained by means of any known device, e.g. a Maltese cross or a more sophisticated device known in the art; moreover, no mention has been made of the transmission members between one shaft and the other, since even in this case these members may be selected amongst those insuring the preservation of the timing and could be chains, toothed wheels, cardan joints, angular transmissions, bevel gear pairs, etc.

In addition, the aforementioned known linear actuators may be of the pneumatic kind, but also oil-operated actuators, electromechanical actuators, etc.

Also, the laser device (known per se) that has been indicated by numeral 4 in FIG. 8 and which is used to detect the diameter of the fruit together with the thickness of the peel and the mesocarp, may be replaced by a feeler or tracer point allowing the mill to follow the outer profile of the fruit (whatever its shape) and to set a fixed value for the thickness of the layer (peel plus mesocarp) to be removed. Therefore, the solutions to this problem may range from the just mentioned simple one, to the most sophisticated (known) solutions, which nowadays correspond to the laser device provided for in the previous embodiment.

According to the illustrated and described embodiment, the small heads that retain the fruit in stations No. 3 and 4 are motorized on one side only, but it goes without saying that the small heads forming each pair of spindles could both be driven by a motor, and this is particularly important if delicate fruits or other products are to be peeled.

Figure 14:
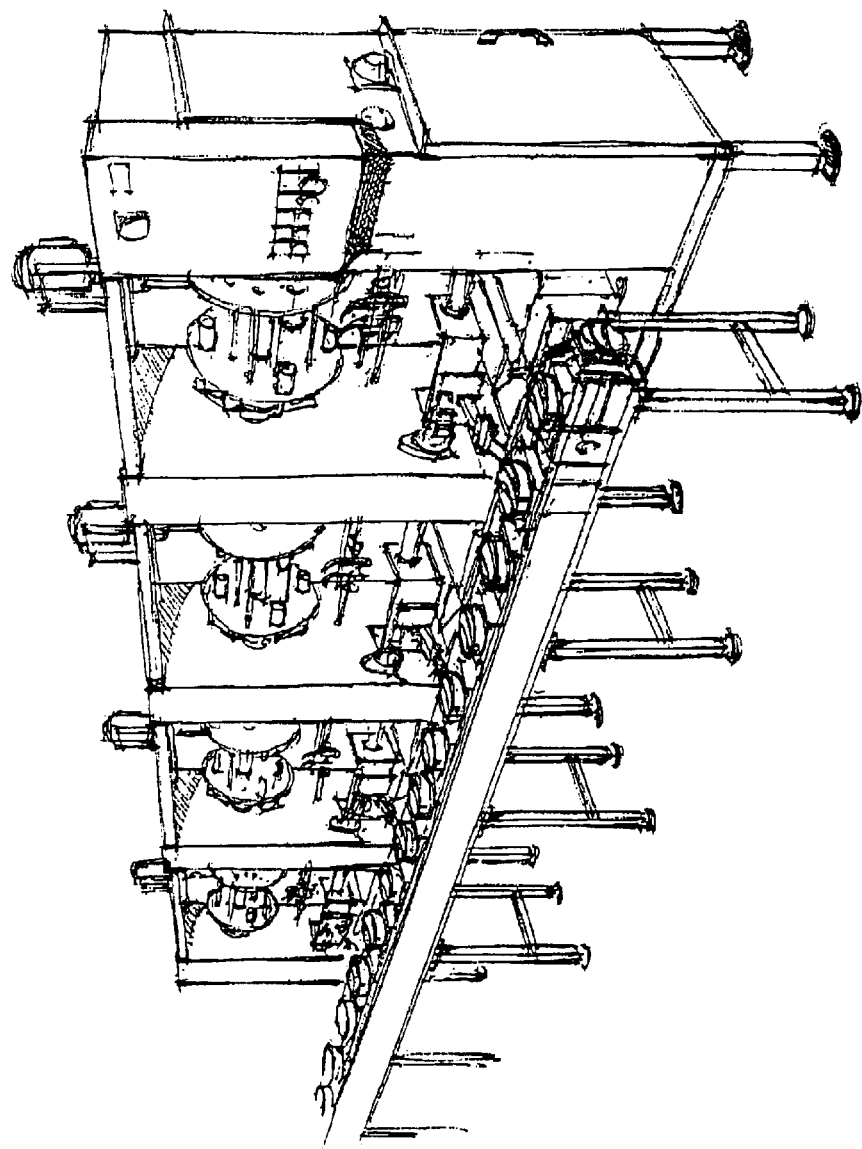
FIG. 14 schematically shows a possible embodiment of a peeling machine that simultaneously works in four "rows" (production lines), thereby quadruplicating the productivity.

We also mention the fact that the peeling machine may comprise several modules, as shown in FIG. 14, in order to increase productivity.

In the illustrated version the feeder forms a single entity and is provided transversally with respect to the advancement direction of each peeling line, even though this is not necessarily the case; in fact, each peeling line could be associated to a respective feeder, as obtained by laterally aligning several single peeling machines like the one already illustrated and described.

The operation of the machine according to the present invention will be described next.

The fruits are individually and manually put in the respective cups of the feeder, with their symmetry axes directed horizontally and perpendicularly to the advancement direction of the feeder. The pliers pick up a respective fruit from a cup and transfer it to a position between two mandrels of the first work station of the four-station turntable; the fruit is arranged in such a way that its symmetry axis is parallel and concentric to the axis of the spindles (mandrels). The fruit is clamped between the spindles and rotated towards and into the second work station. In this second station, a laser device measures the diameter of the fruit, together with the thickness of the layer formed by the peel and mesocarp, which must be removed.

The measured data are used to position the peeling mill and to govern its movement. Thereafter, the fruit is rotated towards and into the third station, where it is spun around its axis in order to peel it. The peel is generally removed in the form of a single, spiral-like strip, and it falls onto an inclined plane and is guided towards an appropriate container. Then, the fruit is rotated towards the fourth station, it is spun around its axis, and at the same time the blades perform the cutting of the ends on the two sides adjacent to the spindles. The cutting blades and the spindles open to permit the discharge of the fruit onto an inclined plane, which conveys it towards an appropriate container. The knockouts insure the discharge of the small discs (calottes) of the peel separated during end-cutting. This cycle is repeated for the following fruits.

As apparent from the above description of preferred embodiments, the invention is not limited to the above examples, which were only presented for illustrative purposes; on the contrary, it must be borne in mind that other steps, examples, components, and processes are intuitive for a skilled person that has taken cognizance of present disclosure, and that therefore, they should not be considered to depart from the scope of the invention as claimed.

What is claimed is:

1. A machine for the industrial peeling of citrus fruits, characterized in that it comprises:

a feeder, which is actuated by an intermittent mechanism that moves the feeder in synchronism with the machine;

a manipulator, including pliers used to grasp and to pick up the fruit from the feeder, and to displace it towards a predetermined position;

a rotatable turntable, having a horizontal axis and four work stations, wherein in the first station the fruit is clamped and retained, and thereafter it is rotated successively towards the following stations;

four mechanisms, individually associated to a respective station, and having each a specific function, that is, to clamp and retain the fruit, to detect and assign a numeric value to dimensions of the fruit, to peel the fruit, to cut the ends of the fruit at the seizing portions and to separately discharge the peel and the peeled fruit; and a mechanism that brings about said intermittent motion.

2. A machine according to claim 1, wherein said feeder includes chain means of a known kind, or any equivalent known means, that move horizontally and intermittently with a fixed pitch and in synchronism with the other devices of the machine.

3. A machine according to claim 2, wherein cups or caps are attached to the chain means at mutual distances corresponding to the advancement pitch of the chain means, said cups or caps being sized and configured in such a way as to be able to receive and preserve the orientation of the fruit therein, after it has been manually put on a said cap with its symmetry axis arranged horizontally and perpendicularly to the chain means advancement direction.

4. A machine according to claim 1, wherein said manipulator includes:
  a) pliers configured and dimensioned for picking up and grasp the fruit from said feeder;
  b) a plurality of levers and connecting rods that are appropriately sized and connected to each other so that, through the intervention of a cam or of a known linear actuator, the fruit is displaced from the position where it is picked up, towards a position corresponding to the prolongation of the operative axis of the first work station of said four-stations turntable.

5. A machine according to claim 4, wherein said pliers of the manipulator are preferably actuated by means of a pneumatic actuator.

6. A machine according to claim 4, wherein the manipulator is apt to displace the fruit so that the symmetry axis of the latter is arranged horizontally and concentrically to the prolongation of the operative axis of the first station comprised in said four-stations turntable.

7. A machine according to claim 4, wherein said cam or said linear actuator actuates the manipulator in synchronism with the movement of the feeder and of the four-stations turntable.

8. A machine according to claim 1, wherein said rotatable turntable, with horizontal axis and four stations, is orthogonal to the advancement direction of said feeder and is synchronized with respect to the intermittent motion of the feeder and manipulator, and moreover it includes the following features:
  a) a central motorized shaft (27) which is intermittently moved;
  b) two circular plates (26/a, 26/b) integral with said shaft and spaced apart from each other;
  c) four spindle pairs mounted on the circular plates, wherein four spindles are arranged on a first circular plate and on the same circumference, at 90° to each other, and the other four spindles are arranged on the second circular plate, with their axes parallel and concentric to the axes of the former four spindles;
  d) four rods (37), located adjacent to each spindle pair, and whose axes are parallel to the spindle axes;
  e) four rocker arms (39) connecting an end of a respective rod with a small shaft (29) that supports each spindle of a circular plate (26/a);
  f) four brackets (36) connecting the other end of the rods (37) to each small shaft (33) that supports each spindle (31) arranged on the other said circular plate (26/b); and
  g) four locking devices (43), each of which is associated to a rod and may be independently operated to prevent or to permit axial sliding of the rods, so that, by pushing in the axial direction on the brackets which connect a respective rod to a small shaft (33) that supports a spindle, both spindles forming a pair of spindles come closer to each other or move away in a self-centering manner with respect to a point that may be considered the reference point, and wherein said reference point associated to each spindle pair is located equidistantly from the surfaces of the circular plates, due to the fact that said small shafts (29, 33) that support the spindles may axially slide an their supports in the same way as the rods (37) can do.

9. A machine according to claim 8, wherein the small heads of the eight spindles are idly mounted on the respective small shafts that support them.

10. A machine according to claim 8, wherein the four spindles (31) mounted on one circular plate (26/b), carry an integral toothed pinion (35) on the opposite side with respect to the circular plate, and this toothed pinion is associated to a motorized toothed wheel in the third and fourth stations of the turntable, in such a way that the spindles are driven in the latter stations and spin the fruit which is clamped between the spindles of a spindle pair.

11. A machine according to claim 8, wherein the eight spindles carry frontal thorns (42) apt to stick in the peel of the fruit when they are pushed towards the fruit.

12. A machine according to claim 8, wherein in the first work station of the turntable the fruit is clamped between two spindles (28, 31).

13. A machine according to claim 12, wherein a linear actuator (41) supported by the machine structure, or basement, is apt to exert a pressure on the bracket (36) that connects the rod (37) to the small shafts (29, 33) that sustain the spindles (28, 31), whereby the latter may clamp the fruit, and when the locking device (43) of the rod (37) has been actuated, the actuator (41) that has caused the clamping of the fruit between the spindles (28, 31) may retract while the fruit remains clamped.

14. A machine according to claim 8, wherein a device of a known kind, which is located in the second station of the turntable, and which is suited to measure, or at least to detect, at least the fruit diameter, and to transmit or transfer these data to the successive station, allows to control the peeling mechanism arranged in the third station of the turntable.

15. A machine according to claim 14, wherein, in order to make sure that in said successive station a peeling mill will remove only the peel together with the underlying mesocarp,
  a) an electronic feeler or tracing point (4) of a known kind, which feels and follows the outer surface of the fruit, sends a proportional signal to an encoder, and the latter, by means of a step motor, continuously adjusts the tilt of a mill carrying arm, thereby insuring a regular peeling, according to the measurement of the layer to be removed, which was previously estimated on the basis of fruits sampling, and according to the resulting regulation of the projection to be assigned to the mill with respect to the feeler; or
  b) a laser feeler or an ultrasound feeler (4) of a known kind is used, which besides measuring the dimension of the fruit, also continuously determines the value of the thickness of the peel and mesocarp.

16. A machine according to claim 8, wherein at the third work station and on the machine's fixed structure or basement, there is provided a milling device which is known per se, and which is positioned in such a way as to be able to carry out fruit peeling by virtue of the following:

the fruit is transferred to the third work station;

the peeling device has independent driving means of said mill;

the latter receives from the preceding station a proportional signal defining the position to be assumed by the mill with respect to the fruit's geometric center;

the peeling device begins to operate after a signal, synchronized with the other stations, has been received by it;

the fruit is spun.

17. A machine according to claim 8, wherein at the fourth work station, and on the machine's structure or basement, there is provided, at an appropriate position, a mechanism including a rod (54) and a rocker arm (55) similar to that used to clamp the fruits on the turntable (3), said device centering in an automatic way two cutting blades (6) in accordance to the distance existing between the spindles (28, 31) that retain the fruit (11).

18. A machine according to claim 17, wherein:

the fruit is spun;

the two cutting blades (6) are made to approach and to contact the fruit by the action of a cam;

the two cutting blades perform the fruit end-cutting operation simultaneously, in proximity of the spindles (28, 31) used to retain and to spin the fruit;

the cutting leads to the removal of calottes (48,49) which have not been peeled.

19. A machine according to claim 18, wherein, after the end-cutting, the blades return to their rest position, the rod locking device (43) unlocks, and the peeled fruit cut at its ends can fall onto an inclined plane (58) that guides it to a container, or onto a conveyor belt.

20. A machine according to claim 19, wherein to make sure that the removed calottes do not remain on the thorns (42) of the spindles, there is provided a linear actuator (60) that acts on knockouts (59) received inside said small shafts (29, 33) which support the spindles (28, 31), said knockouts consisting of simple axially slidable round bars.

21. A machine according to claim 1, wherein said intermittent mechanism may be realized in any known configuration, for instance as a Maltese cross.

22. A machine according to claim 1, wherein said connections between the various mechanisms that form the machine, are also of a known kind, and are selected among those insuring the preservation of the timings, e.g.

chain transmissions;

toothed wheel transmissions;

cardan shaft transmissions;

and wherein the machine could be realized so as to comprise a single module, as described and illustrated above, or so as to include several modules, and in the latter case with a single feeder or with a feeder for each module.

* * * * *